United States Patent [19]
James

[11] 3,731,802
[45] May 8, 1973

[54] LIQUID SEPARATOR

[76] Inventor: William S. James, 1483 Pine Knoll Lane, Mamaroneck, N.Y. 10543

[22] Filed: Mar. 23, 1971

[21] Appl. No.: 127,142

[52] U.S. Cl. ................. 210/71, 210/84, 210/197, 210/533, 210/540, 210/DIG. 21
[51] Int. Cl. ........................................... B01d 17/00
[58] Field of Search ................ 210/532, 533, 537, 210/538, 540, DIG. 21, 83, 84, 71, 197

[56] References Cited

UNITED STATES PATENTS

| | | | |
|---|---|---|---|
| 2,782,929 | 2/1957 | Colket | 210/540 X |
| 1,032,458 | 7/1912 | White | 210/540 UX |
| 2,826,306 | 3/1958 | Burns | 210/533 X |
| 3,419,145 | 12/1968 | De Celis | 210/84 |
| 1,702,613 | 2/1929 | Morse | 210/84 |
| 3,614,873 | 10/1971 | Cole et al. | 210/71 X |

*Primary Examiner*—Samih N. Zaharna
*Assistant Examiner*—F. F. Calvetti
*Attorney*—McGlew and Tuttle

[57] ABSTRACT

A device for separating two liquids of different density includes a closed tank having an entry section of relatively small area with an overflow into a relatively large area settling tank. The large area settling tank has a withdrawal portion at its top which permits overflow of the lighter liquid into a trough and delivery downwardly into a relatively small area intermediate tank portion. The small area intermediate tank portion in turn has an overflow only for oil into a recovery tank at one end of the device. The lower end of the intermediate small area tank has a lower connecting passage to a second intermediate tank which overflows at the top into a small area collecting tank for delivery out of the apparatus. The large area settling tank has a lower connecting passage for the flow of the heavier liquid into a heavy liquid collection passage which overflows to the outlet which is provided in the second small area outlet tank. The arrangement is such that the flow of the heavier liquid takes place from one end of the device to the outlet and there is a further counterflow of this heavier liquid from the lighter liquid collecting storage back to the second outlet tank for the heavier liquid.

14 Claims, 4 Drawing Figures

Patented May 8, 1973

INVENTOR.
WILLIAM S. JAMES
BY
McBew & Tuttle
ATTORNEYS

Patented May 8, 1973

INVENTOR.
WILLIAM S. JAMES
BY
McGlew & Tuttle
ATTORNEYS

LIQUID SEPARATOR

SUMMARY OF THE INVENTION

This invention relates in general to a device for separating liquids of different densities and in particular to a new and useful tank separator particularly for oil and water mixes which is capable of operation independently of the incoming oil and water mix rations.

It is known to provide for separation of liquids or different densities by permitting their separation in a tank and effecting the withdrawal of the lighter density liquid from the top of the tank and the heavier liquid from the bottom of the tank. The present invention is an improvement over the known constructions particularly in respect to the provision of a recovery device which can operate substantially without any attention to effect the complete separation of two liquids of different density, for example oil and water. In the preferred form the oil and water mix is directed into a large size tank and it is permitted to overflow from the entrance tank into a relatively large settling tank where the velocity of movement of the material is reduced considerably. The large sized settling tank in turn has an overflow at its top which connects through a trough to a small sized intermediate tank at the opposite end of the device which permits the final separation of the two liquids and the overflow of the lighter liquid into a collecting storage tank. The heavier liquid in turn flows in two directions from the final separation in the small storage tank through a lower passage and then overflows into an output tank for delivery out of the device. This output tank also receives water from the large settling tank which flows in an opposite direction into an intermediate small area tank and then overflows into the output tank.

Accordingly it is an object of the invention to provide an improved device which can operate substantially without attention to effect the substantial complete separation of two liquids of different densities for example oil and water.

A further object of the invention is to provide a device for effecting the continuous and substantially operation free collection and separation of a lighter fluid for example such as oil from a heavier liquid such as water and for the separate removal of each constituent for reuse in an industrial process, for example for use in coolant system for steel rolling mills and which is referred to as tramp oil.

A further object of the invention is to provide a device for settling liquids of different density which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

GENERAL DESCRIPTION OF THE PREFERRED EMBODIMENT

Figure 1:
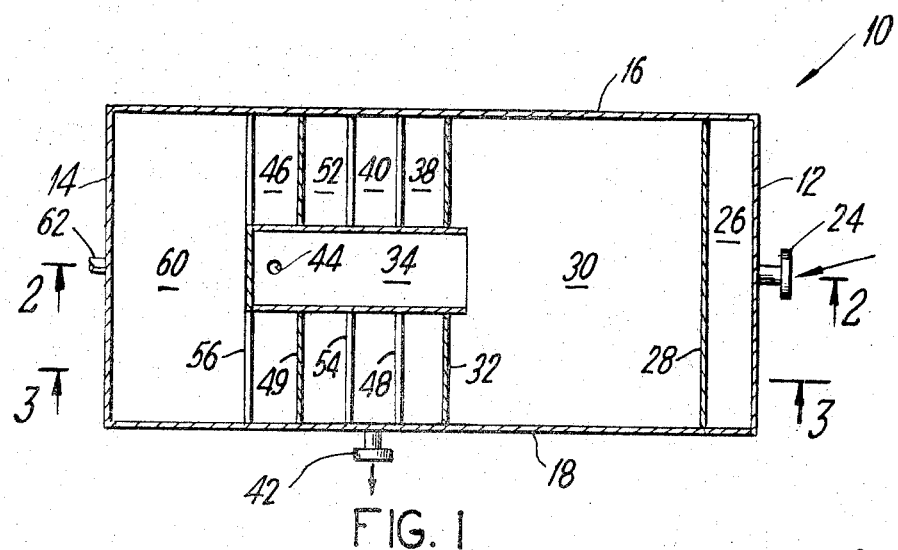
FIG. 1 is a horizontal sectional view taken along the lines 1—1 of FIG. 2.
Figure 2:
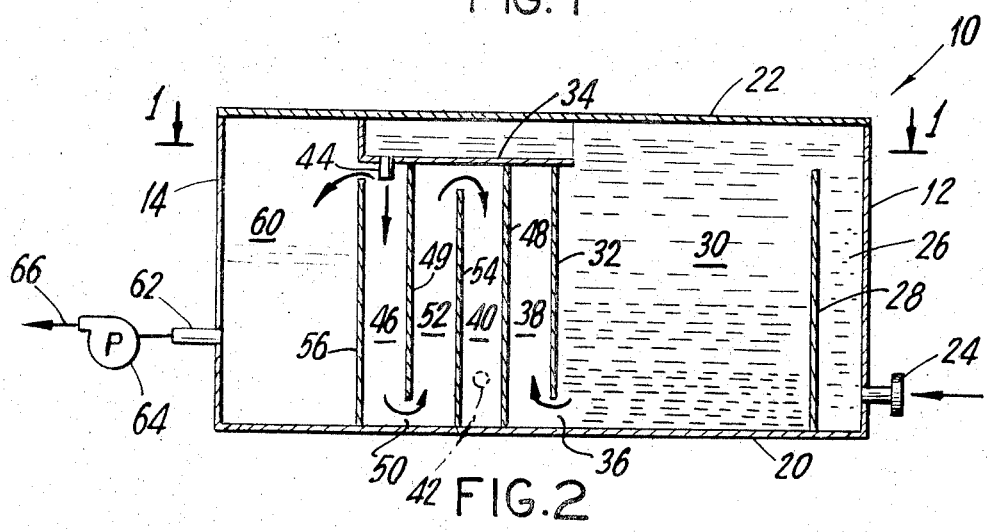
FIG. 2 is a section taken along the line 2—2 of FIG. 1.
Figure 3:
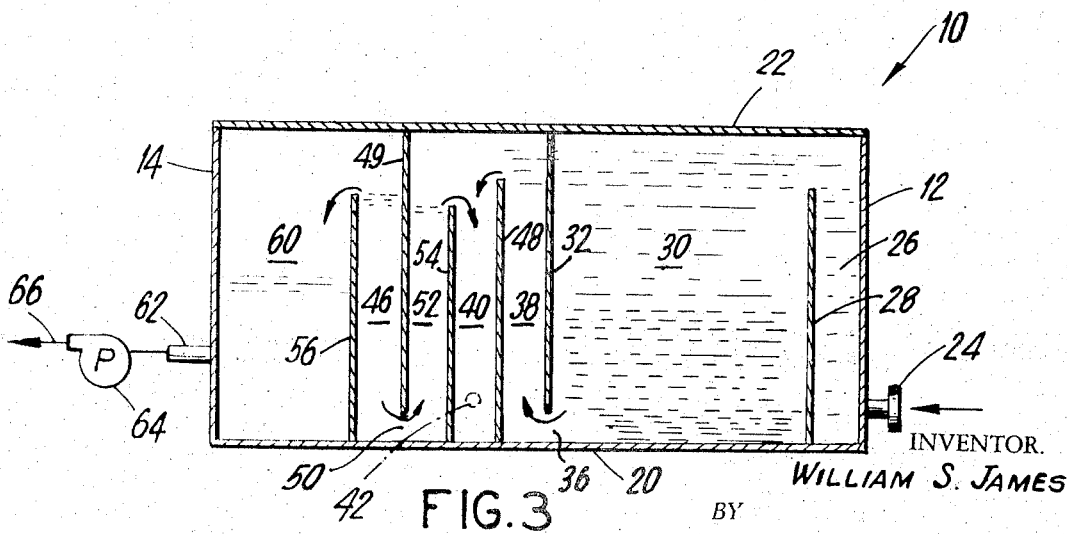
FIG. 3 is a section taken along the line 3—3 of FIG. 1.

Referring to the drawings in particular the invention embodied therein comprises a device generally designated 10 which in the embodiment shown comprises a substantially rectangular tank having end walls 12 and 14, side walls 16 and 18, and a bottom 20 and a top 22. The end wall 12 is provided with an inlet fitting 24 for the inflow of a water and oil mix or any liquids of two different densities. The mixture flows inwardly through the fitting 24 into an inflow tank 26 is divided by a partition wall 28 which does not extend up to the top 22 and which defines an overflow into a relatively large diameter settling tank 30. The opposite end of the settling tank 30 is divided by a partition wall 32, having a top overflow connected into an overflow trough 34; and the bottom includes a passage 36 which connects into a small-area heavier-liquid collecting tank 38. The collecting tank 38, in turn; as best indicated in FIG. 3, overflows into an overflow or outlet tank 40 of relatively small area which is provided with an outlet fitting 42 for the delivery of the heavier liquid out of the device 10.

The settling tank 30 is designed for approximately ten minutes retention and this allows the lighter liquid such as oil to rise and collect on the surface and to move along the trough 34 and out a conduit 44 into a final stage lighter liquid separating tank 46.

The heavier liquid in the settling tank 30 flows under the partition 32 through the passage 36 and into the heavier liquid collecting tank 38 and no lighter liquid will follow this path. The heavier liquid such as water and which is now free of oil will pass through the heavier liquid collecting tank 38 and over the top of a partition 48 which is arranged at the opposite end of this tank and into the outlet tank 40. The partition 48 defines baffle means to maintain the proper level in the tank 30. The heavier liquid or water which follows this path will move out through the outlet 42 of the outlet tank 40.

The lighter liquid, such as oil, which moves along the trough 34 and is directed through the conduit 44 will move into the final stage lighter liquid separating tank 46 which is divided at one end by a baffle or partition 49 having an opening or passage 50 at its lower end for the passage of any heavier liquid such as water which may remain at this stage. This heavier liquid will move through the passage 50 and into a second heavy liquid collecting tank 52 which is separated from the outlet tank 40 by a partition 54. The partition 54 permits overflow of the heavier liquid from the heavier liquid collecting tank 52 into the outlet tank 40 and through the outlet 42. The liquid which passes through the conduit 44 includes principally the lighter liquid such as oil but it may include some water which will be removed through the passage 50. The oil however will spill over a partition wall 56 which is defined between the final stage liquid separating tank 46 and a final lighter liquid collecting tank 60. This separated lighter liquid 60 may be removed and reused by pumping it through a connecting conduit 62 with a pump 64 through a discharge conduit 66 which leads to the place of use.

The partition wall 54 defines a baffle which regulates the amount of spill over of the water in the final stage small area tank 52 and this water of course joins the water moving outwardly from the final stage collecting tank 38 at the opposite end of the device.

The operation of the device is simple and once all of the chambers are full the system is self-balancing and requires no control or adjustment. At the startup it is preferable to fill the final stage liquid separating tank 46 and the heavier liquid collecting tank 52 with clean water or with a clean supply of the heavier liquid as the case may be. The continuous operation of the device is independent of the ratio of the liquids of different densities and it permits a wide variation of inflow quantity. An unusually high percentage of the lighter liquid may require enlarging of the trough 34 and its conduit 44.

Figure 4:
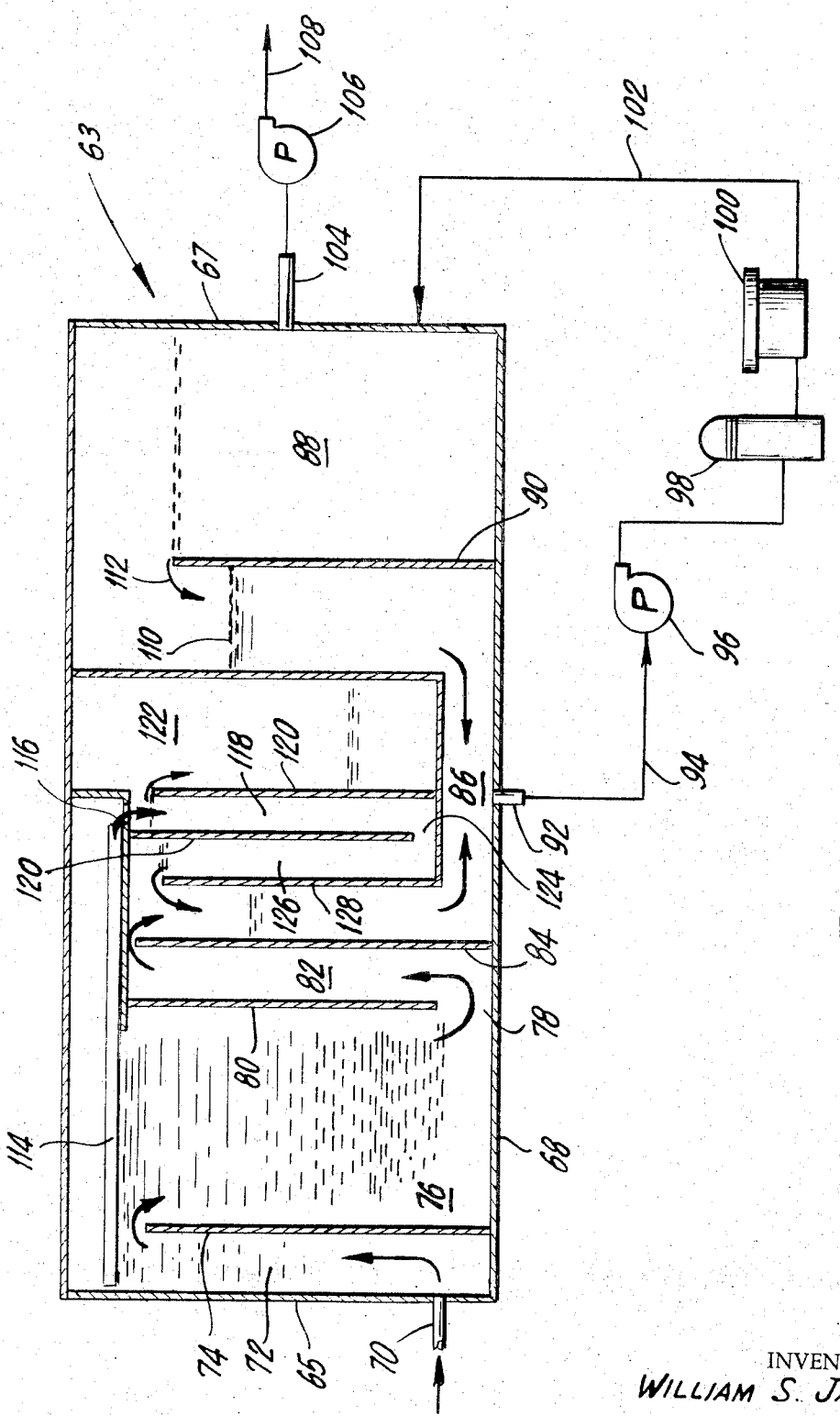
FIG. 4 is a view similar to FIG. 2 of another embodiment of the invention.

In the embodiment indicated in FIG. 4, there is shown a system for treating soluble oil coolant which is delivered from a steel mill rolling operation in order to remove "tramp oil." For this system there is provided a separating device generally designated 63 which is of rectangular tank configuration as in the other embodiment and it includes end walls 65 and 67 and a bottom 68 which are visible in this view. In this construction the material to be treated is delivered through an inlet fitting 70 into an inflow tank or control tank 72 which is of relatively small size and which is bounded on its inner end by a partition wall 74 which defines an overflow which permits the incoming liquid to flow over into a settling tank 76. The wall 74 provides means for controlling the inflow velocity and for permitting the settling of the material in the settling tank 76 in order to facilitate the accumulation of the lighter liquid at the top of the surface and the outflow of the heavier liquid through a lower passage 78 defined in a partition wall 80. The partition wall 80 bounds one side of a small size passage 82, which has a top overflow at the top of a partition wall 84, which permits down feeding into a U-shaped heavy water receiving tank 86. The heavier liquid which is accumulated in the U-shaped receiving tank 86 is also fed from a final stage storage tank 88 whenever the latter overflows over a partition wall 90.

In the system indicated in FIG. 4 the heavier liquid is circulated outwardly from an outlet fitting 92 through a conduit 94 by a pump 96, into a filter 98, and a cooler 100, and is then returned through a conduit 102 back into the storage tank 88. In this variation there is a control between the flow conditions which result as a consequence of the filling of the tank 88 or the removal of the stored liquid through a removal line 104 through a pump 106, back to the steel mill through a conduit 108. The liquid is usually circulated from the outlet 92 by an amount at least sufficient to maintain the level 110 below the level of the wall 90 so that there is always a spilling backwardly of the liquid, as indicated by the arrow 112, rather than an overflow in the other direction.

The system of FIG. 4 also includes means for separating the lighter liquid and these means include a trough feeder connection 114 which permits feeding of the lighter liquid as indicated by the arrow 116 from the top of the settling tank 76 down into a lighter liquid receiving tank 118. The lighter liquid receiving tank is bordered on one end by a partition wall 120 which permits overflow of the lighter liquid into a holding tank 122 and also flow of the heavier portion of this lighter liquid through a passage 124 to an overflow tank 126 wherein the lighter constituents or the total quantity is permitted to spill over a partition wall 128 into the U-shaped receiving chamber 86.

While a specific embodiment of the invention has been shown and described in detail to illustrate the application of the principles of the invention, it will be understood that the invention may be embodied otherwise without departing from such principles.

What is claimed is:

1. A device for separating the individual liquids of a liquid mix of liquids of different densities, comprising a tank housing having an inflow tank portion with an inflow partition wall at one end defining a top overflow for the liquid mix which is delivered into said inflow tank, an inflow fitting connected into said inflow tank for the delivery of the liquid mix to said inflow tank portion, a relatively large settling tank portion defined adjacent said inflow tank portion and receiving all of the inflow liquid which flows over said inflow partition, a settling tank partition in said tank housing defining a top overflow from said settling tank portion for the lighter liquid and a bottom passage for the heavier liquid, a baffle partition in said tank housing spaced from said settling tank partition, a heavier liquid collecting tank portion defined on one end by said settling tank partition and on its opposite end by said baffle partition, an outlet tank portion for heavier liquid located adjacent said baffle partition in a location to receive only liquid discharged over the top of said baffle partition, means defining a lighter liquid receiving tank portion in said housing, conduit means connecting aid top overflow of said settling tank to said lighter liquid receiving tank portion, means defining a lighter liquid collection tank portion in said housing adjacent said lighter liquid receiving tank portion, and lighter liquid overflow partition means permitting overflow of only the lighter liquid from said lighter liquid receiving tank portion into said lighter liquid collection tank portion.

2. A device according to claim 1 wherein said means defining said lighter liquid collection tank portion includes a wall having a passage adjacent the bottom thereof for the passage of heavier liquid said passage being connected to said outlet tank portion.

3. A device according to claim 2 including a heavier liquid retention tank adjacent said outlet tank said heavier liquid retention tank being connected at its lower end to said lighter liquid collection tank, and having an overflow adjacent its top for overflow of the heavier liquid into said heavier liquid outlet tank portion.

4. A device according to claim 3 wherein said conduit means connecting said top overflow of said settling tank to said lighter liquid receiving tank includes a trough extending over said heavier liquid outlet tank portion end discharging into said lighter liquid collection tank portion.

5. A device according to claim 1 wherein said inflow tank is relatively small, said baffle means defining a control for the flow of liquid from said inflow tank to said settling tank.

6. A device for separating the individual liquids of a liquid mix of liquids of different densities particularly for separating soluble oil coolant to remove tramp oil therefrom, comprising a housing, a settling tank in said housing having an inlet, baffle flow means in the path of flow from said inlet connected to said settling tank preventing turbulent inflow of a liquid mix into said settling tank whereby to permit settling of the liquids of different densities in said settling tank, a lighter liquid receiving tank defined in said housing, top overflow means connected from the top of said settling tank to said lighter liquid receiving tank for the flow of the lighter liquid off the top of said settling tank into said lighter liquid receiving tank, a heavy liquid collecting tank in said housing, lower passage means in said settling tank connected to said heavy liquid collecting tank for the flow-off of the heavier liquid from said settling tank into said heavier liquid collecting tank, heavy liquid flow baffle means between said settling tank and said heavier liquid collecting tank for regulating the flow of liquid off from said settling tank into said heavier liquid collecting tank and a heavy liquid flow passage defined between said lighter liquid receiving tank and said heavier liquid receiving tank and located adjacent the bottom of said lighter liquid receiving tank in order to permit the passage over of the heavier liquid portion of that quantity of the lighter liquid which is removed from the liquid mix in said settling tank.

7. A device according to claim 6 wherein said heavy liquid flow baffle means includes a partition wall, said settling tank having a settling tank wall spaced from said partition wall and defining a lower passage therein for flow from said settling tank into the space between said settling tank wall and said partition wall, said partition wall being located adjacent said heavy liquid receiving tank and permitting overflow of the heavier liquid into said heavy-liquid receiving tank.

8. A device according to claim 6, wherein said lighter liquid overflow means includes a trough arranged at the top of said settling tank in a position to receive all of the lighter liquid which flows up above a predetermined level, said trough having an opening into said lighter liquid receiving tank.

9. A device according to claim 8, wherein said heavier liquid receiving tank comprises a U-shaped receiving chamber having a leg portion on each side of said lighter liquid receiving tank.

10. A device according to claim 6, including a heavier liquid storage tank located alongside said heavier collecting tank, and circulating means for circulating liquid from said receiving tank into said heavier liquid storage tank.

11. A device according to claim 10, wherein said heavier liquid storage tank includes an overflow emptying into said heavier liquid receiving tank.

12. A device according to claim 11, including means for removing the liquid from the heavier liquid storage tank for use, said circulating means circulating a quantity of liquid to said heavier liquid storage tank to maintain it in a condition at which at least a portion of the liquid over-flows backwardly into said heavier receiving tank.

13. A method of treating a liquid mix of liquids of different densities using a tank which is divided up into a plurality of individual tank portions including a large settling tank with an overflow for the light liquid and with a bottom passage for heavier liquid, a lighter liquid storage tank, an intermediate tank and a heavy liquid storage tank, comprising directing a fluid mix into the settling tank in a manner to control the inflow velocity and permit the maintenance of settling conditions in the settling tank and the continuous overflow of the top of the settling tank, withdrawing the heavier liquid from the bottom of the settling tank and permitting it to flow outwardly to a heavy liquid tank at a rate determined by a head of water comparable to the height of the liquid in the settling tank, removing the lighter liquid from the settling tank from the top thereof at a rate set by the height of the liquid in the settling tank to produce the overflow of the lighter liquid, directing the overflowed lighter liquid into an intermediate tank, and permitting simultaneous overflow of the lighter liquid from the intermediate tank into a lighter liquid storage tank and the withdrawal of the heavier liquid from the bottom of the intermediate tank to the heavy liquid tank.

14. A device according to claim 13, including filtering and cooling the liquid which is collected in the heavy receiving tank before it is circulated back to the heavy liquid storage tank.

* * * * *